Aug. 14, 1951  W. D. STOHLMAN  2,564,454
SHROUD FOR ANIMAL CARCASSES
Filed Oct. 15, 1949
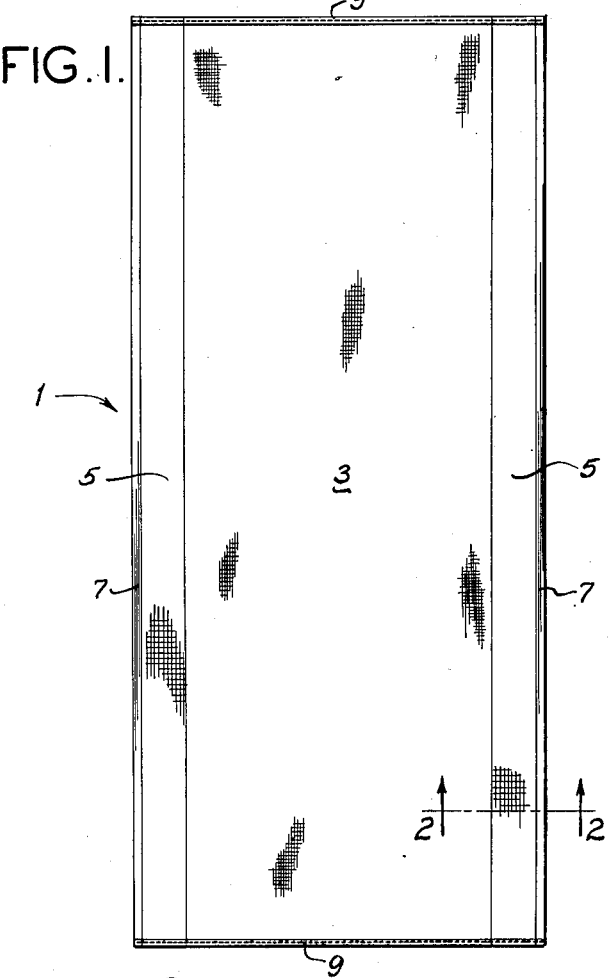
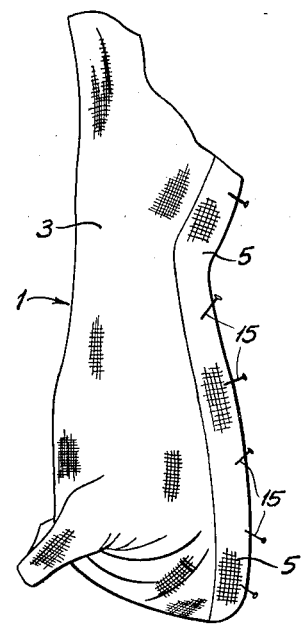
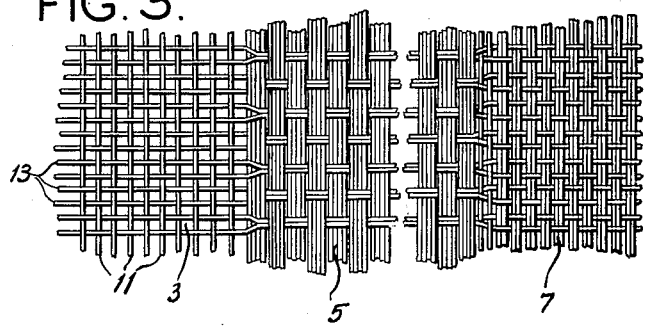
William D. Stohlman,
Inventor,
Haynes and Koenig
Attorneys.

Patented Aug. 14, 1951

2,564,454

UNITED STATES PATENT OFFICE 2,564,454

SHROUD FOR ANIMAL CARCASSES

William D. Stohlman, Clayton, Mo., assignor to Bemis Bro. Bag Company, St. Louis, Mo., a corporation of Missouri Application October 15, 1949, Serial No. 121,609

3 Claims. (Cl. 139—383)

This invention relates to shrouds for animal carcasses, more particularly to so-called "meat shrouds" which are wrapped around skinned animal carcasses or parts of carcasses to absorb blood and keep the outer layer of fat smooth and white.

It is customary in the meat packing industry to wrap a piece of cloth, referred to as a "shroud," around a skinned carcass or part of a carcass (a side of beef, for example), to absorb blood and keep the outer layer of fat smooth and white. In practice, such shrouds are kept in place wrapped around the carcass by pins driven through the cloth into the flesh. While it is desirable to wash and re-use such shrouds as much as possible, heretofore they have had a comparatively short life. Heretofore, shrouds have been made from cloth of a relatively tight weave. Driving pins through the cloth resulted in breaking the threads of the cloth or the spreading of threads with resultant formation of permanent, non-reclosable holes in the cloth, or both, thereby leading to early deterioration necessitating early discard. This invention provides a special shroud which, while being absorbent, is of such nature that it may be pinned on a carcass without any substantial breakage of threads and without forming non-reclosable holes. In general, a shroud of this invention comprises a length of cloth woven centrally with a relatively tight, close plain weave throughout the major portion of its width and from one end to the other, and with a close basket weave on both sides of the plain weave adjacent the selvages of the cloth and from one end to the other. Each close basket weave portion constitutes a relatively narrow pin-receiving band extending from one end of the shroud to the other through which pins may be driven without any substantial thread breakage and without formation of non-reclosable holes. Other features will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a plan view of a shroud of the invention;

Fig. 2 is an enlarged fragmentary transverse section taken on line 2—2 of Fig. 1;

Fig. 3 is an enlarged fragmentary plan view, and

Fig. 4 is a perspective illustrating how the shroud is applied to a carcass.

Similar reference characters indicate corresponding parts throughout the several views of the drawing.

Referring to the drawing, a shroud of this invention is generally designated 1. The shroud consists of a length of cloth woven centrally, as shown at 3, with a relatively tight close plain weave throughout the major portion of its width and from one end to the other, and, as shown at 5, with a close basket weave on both sides of the plain weave adjacent the selvages 7 of the cloth from one end to the other. The ends of the length of cloth are hemmed, as indicated at 9. The cloth is woven of yarn of such nature as to be relatively soft and absorbent.

In Figs. 2 and 3, the warp threads are designated 11 and the weft or filling threads 13. In the plain weave portion 3, the warp and weft threads are woven over and under one another singly, thereby forming a tight weave. As shown in Figs. 2 and 3, the space between the threads in the plain weave portion is exaggerated to show the nature of the weave. Actually, the threads lie quite close to one another. In the basket weave portions 5, the warp threads are arranged in groups of four and the weft threads in groups of two, the groups being woven over and under one another. In the selvages, the warp threads are arranged in groups of two woven over and under single weft threads.

Each of the basket weave portions 5 constitutes a relatively narrow band extending from one end of the shroud to the other adjacent its selvages adapted to have pins driven therethrough without any substantial thread breakage or formation of non-reclosable holes. This is because the basket weave is a loose weave and, when a pin is driven through it, the threads easily spread apart so that they are not broken. When the pin is withdrawn, a hole is left where the threads were spread apart, but when the shroud is subsequently washed the threads return to their original positions and close the hole. This result is not attainable with a tight close plain weave wherein the threads cannot easily spread apart. A pin driven through a tight close weave either breaks the thread or spreads the threads apart to such an extent that they cannot return to their original position and close the hole made by the pin.

Fig. 4 shows how the shroud of this invention is wrapped around a carcass with the basket weave bands 5 overlapped and how pins 15 are driven through these bands into the flesh to hold the shroud on the carcass. When the shroud is to be removed, the pins are withdrawn so that the shroud may be unwrapped. Upon subsequent washing, the holes in the basket weave resulting from driving the pins through the weave close up due to the working the cloth receives in being washed.

Thus, with the basket weave bands 5 adjacent the selvages 7, the shroud may be pinned on a carcass without permanent damage and may be washed and re-used many times. While the threads of the basket weave bands 5 are loose and easily spread apart by the pins and easily restored to their normal positions to close any holes formed by the pins, the basket weave is still a close weave and the basket weave portions are as useful as the tight close weave portion 3 as regards their ability to absorb blood from and protect the fat on the carcass. The entire shroud is not made of basket weave cloth because the basket weave is costlier than the plain weave and is not needed except at the margins of the shroud where the pins are driven through the shroud.

In view of the above, it will be seen that the several objects of the invention are achieved and other advantageous results attained.

As many changes could be made in the above constructions without departing from the scope of the invention, it is intended that all matter contained in the above description or shown in the accompanying drawing shall be interpreted as illustrative and not in a limiting sense.

I claim:

1. A meat shroud consisting of a length of cloth woven centrally with a tight close plain weave throughout the major portion of its width and from one end to the other, and woven with a close basket weave on both sides of the tight plain weave adjacent the selvages of the cloth and extending from one end to the other, each of said basket weave portions constituting a relatively narrow pin-receiving band extending from one end of the shroud to the other through which pins may be driven to hold the shroud wrapped around an animal carcass or part thereof without any substantial breakage of the threads of the cloth and wherein threads which are spread apart by a pin may be readily restored to their normal position to close the hole made by the pin.

2. A meat shroud consisting of a length of cloth woven centrally with a tight close plain weave throughout the major portion of its width and from one end to the other, and woven with a close basket weave on both sides of the tight plain weave adjacent the selvages of the cloth and extending from one end to the other, each of said basket weave portions constituting a relatively narrow pin-receiving band extending from one end of the shroud to the other through which pins may be driven to hold the shroud wrapped around an animal carcass or part thereof without any substantial breakage of the threads of the cloth and wherein threads which are spread apart by a pin may be readily restored to their normal position to close the hole made by the pin, the warp and weft threads in the plain weave being woven over and under one another singly, the warp and weft threads in the basket weave portions being arranged in multiple groups woven over and under one another.

3. A meat shroud consisting of a length of cloth woven centrally with a tight close plain weave throughout the major portion of its width and from one end to the other, and woven with a close basket weave on both sides of the tight plain weave adjacent the selvages of the cloth and extending from one end to the other, each of said basket weave portions constituting a relatively narrow pin-receiving band extending from one end of the shroud to the other through which pins may be driven to hold the shroud wrapped around an animal carcass or part thereof without any substantial breakage of the threads of the cloth and wherein threads which are spread apart by a pin may be readily restored to their normal position to close the hole made by the pin, the warp and weft threads in the plain weave being woven over and under one another singly, the warp and weft threads in the basket weave portions being arranged in groups of four and two, respectively, woven over and under one another, the ends of the length of cloth being hemmed.

WILLIAM D. STOHLMAN.

REFERENCES CITED

The following references are of record in the file of this patent:

UNITED STATES PATENTS

| Number | Name | Date |
| --- | --- | --- |
| 821,441 | Stevenson | May 22, 1906 |
| 1,324,864 | Wehner | Dec. 16, 1919 |
| 1,572,605 | Howe | Feb. 9, 1926 |